United States Patent [19]

Hoff

[11] Patent Number: 4,701,699

[45] Date of Patent: Oct. 20, 1987

[54] TELEPHONE STATION TESTING APPARATUS

[75] Inventor: Terry E. Hoff, Noblesville, Ind.

[73] Assignee: General Telephone Company of Indiana, Ft. Wayne, Ind.

[21] Appl. No.: 772,483

[22] Filed: Sep. 4, 1985

[51] Int. Cl.$^4$ .................... H04B 3/46; G01R 19/14
[52] U.S. Cl. ................................ 324/133; 379/21
[58] Field of Search ............... 179/175.3 F, 175.3 R, 179/81 R, 81 C; 324/133, 66, 52, 51; 379/21, 25

[56] References Cited

U.S. PATENT DOCUMENTS

| | | | |
|---|---|---|---|
| 3,818,329 | 6/1974 | Reaves | 324/66 |
| 3,976,849 | 8/1976 | Champan | 179/175.3 R |
| 4,207,517 | 6/1980 | Bloxam | 324/133 |
| 4,210,862 | 7/1980 | Koslar | 324/133 |
| 4,272,142 | 6/1981 | Zapf | 324/133 |
| 4,369,341 | 1/1983 | Ahuja | 324/133 |
| 4,544,807 | 10/1985 | Sers | 379/21 |
| 4,582,965 | 4/1986 | Lembke | 179/175.3 R |

Primary Examiner—Reinhard J. Eisenzopf
Assistant Examiner—Jose M. Solis
Attorney, Agent, or Firm—Theodore Jay, Jr.; J. Stephen Yeo

[57] ABSTRACT

A telephone station test set performs voltage and polarity checks on four and six wire systems. Both four and six wire jacks are provided which are coupled to LED networks. A switch is provided so that both "intercom" and "data" pairs of a six wire system can be tested by the same LED networks.

6 Claims, 1 Drawing Figure

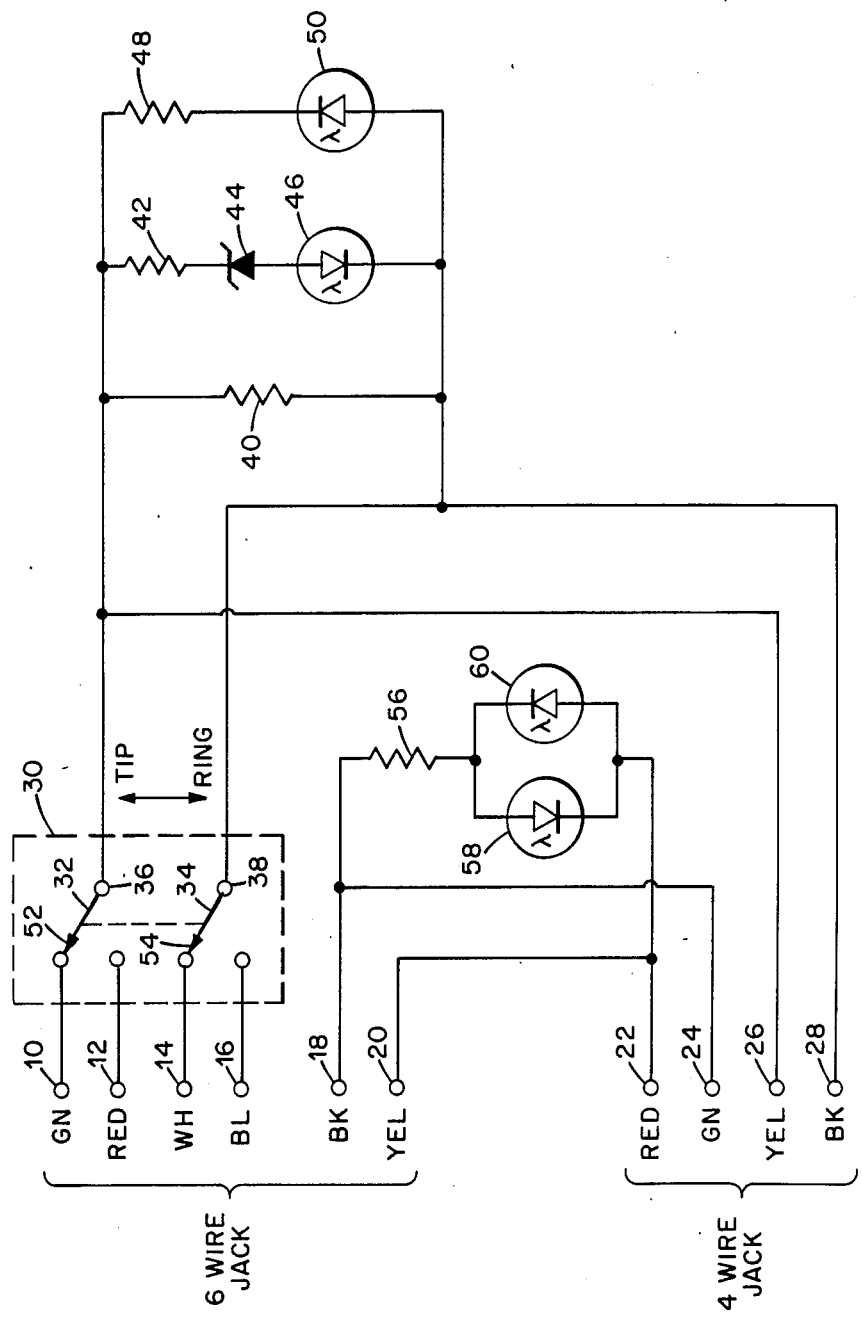

TELEPHONE STATION TESTING APPARATUS

BACKGROUND OF THE INVENTION

Key telephone systems utilize key telephones which can be of four wire or six wire type. These telephones utilize jacks and it is necessary to test the jack wiring.

The present invention is directed toward a new type of testing apparatus which enables a service person to test the jack wiring of both types of phones in a simple, fast and definitive manner.

SUMMARY OF THE INVENTION

Testing apparatus in accordance with the invention comprises a first six wire jack having first, second, third, fourth, fifth and sixth conductors, and a second four wire jack having first, second, third and fourth conductors. The fifth conductor of the first jack is connected to the second conductor of the second jack and the sixth conductor of the first jack is connected to the first conductor of the second jack.

A first network is connected between the fifth conductor of the first jack and the first conductor of the second jack, this network having, in series connection, a first resistor and a first light emitting diode (LED). The first LED is shunted by a second LED. The first and second LEDs have opposite polarities.

A second resistor is connected between the third and fourth conductors of the second jack. A second network shunts said second resistor and has, in series connection, a third resistor, a zener diode and a third LED. A third network shunts the second network and has, in series connection, a fourth resistor and a fourth LED. The third and fourth LEDs have opposite polarities.

A manually operated two position switch is connected between the first, second, third and fourth conductors of the first jack and the third and fourth conductors of the second jack. This switch has a first position at which the first and third conductors of the first jack are connected to the third and fourth conductors respectively of the second jack and a second position at which the second and fourth conductors of the first jack are connected to the third and fourth conductors respectively of the second jack.

When this apparatus is utilized in the manner described below, the jack wiring of four wire and six wire telephones can be tested quickly, easily and effectively.

BRIEF DESCRIPTION OF THE DRAWINGS

The accompanying FIGURE is a circuit diagram of the invention.

DETAILED DESCRIPTION OF PREFERRED EMBODIMENT

The station wire tester is designed for four or six wire telephones to test several electrical parameters at the telephone location of the customer. the parameters tested are as follows:

1. Continuity of telephone tip and ring
2. Polarity of telephone tip and ring
3. Continuity of telephone power (4-wire and 6-wire)
4. Polarity of telephone power (4-wire and 6-wire); and
5. Continuity of Intercom and Data tip and ring (6-wire only).

These telephones incorporate microprocessors which must receive an input voltage of twenty to thirty volts for proper operation.

Referring now to the FIGURE, a first six wire jack has conductors 10 (green), 12 (red), 14 (white), 16 (blue), 18 (black) and 20 (yellow). A second four wire jack has conductors 22 (red), 24 (green), 26 (yellow) and 28 (black). Conductor 20 is connected to conductor 22. Conductor 18 is connected to conductor 24.

A double pole double throw manually operated switch 30 has two ganged arms 32 and 34. The fixed contacts 36 and 38 of these areas are connected to conductors 26 and 28 respectively. A load resistor 40, typically having a value of 150 watts (which prevents any high resistance connection to the invention) is connected between contacts 36 and 38.

A first network consisting, in series connection, of a current limiting resistor 42, (typically having a value of 560 ohms), a zener diode 44 (typically rated at fourteen volts) and a green emitting light emitting diode (LED) 46 is connected across resistor 40. A second network consisting of another current limiting resistor 48, (typically having a value of six hundred and eight ohms, and a red emitting LED 50 is connected across the first network. LEDS 46 and 50 are poled in opposite sense.

Switch arms 32 and 34 have movable contacts 52 and 54. When the switch is in the TIP position, as shown in the Figure, contacts 52 and 54 are connected to conductors 10 and 14 respectively. When the switch is in the other (RING) position, contacts 52 and 54 are connected to conductors 12 and 16 respectively.

Conductor 18 is connected via another current limiting resistor 56 (having the same value as resistor 48) and a second green emitting LED 58, in series connection, to conductor 22. An amber emitting LED 60 shunts LED 58 and is poled in reverse sense thereto.

In order to test four wire telephones, the four wire jack is connected to the matching plug of the telephone. If the wiring and voltage conditions within the telephone are correct, LEDS 46 and 58 will be energized and LEDS 50 and 160 will be dark. If there is an open circuit condition, all LEDS will be dark. If one or both conductor pairs are reversed, one or both of LEDS 50 and 60 will be energized and the other LEDS will be dark.

In order to test six wire telephones, the six wire jack is connected to the matching plug of the telephone. The 6-wire circuit supplies power to the telephone diplexed over the intercom and data circuits. Consequently, power must be available via both tip and ring of both of these circuits. The 6-wire test circuit enables the tester first to test the voltage and wiring conditions on the tip side and secondly to test for the same conditions on the ring side.

With switch 30 in the TIP position, the two energized LEDS 46 and 58 will be energized if the wiring and voltage conditions are correct. Similarly, when switch 30 is in the RING position, the same LEDS will be energized if wiring and voltage conditions are correct. As before, if all LEDS are dark during test, there is an open circuit condition. Conductor pair reversal conditions are indicated when either or both LEDS 60 and 50 are energized.

What is claimed is:
1. testing apparatus comprising:
    a first six wire jack having first, second, third, fourth, fifth and sixth conductors;

a second four wire jack having first, second, third and fourth conductors, the fifth conductor of the first jack being connected to the second conductor of the second jack, the sixth conductor of the first jack being connected to the first conductor of the second jack;

a first network connected between the fifth conductor of the first jack and the first conductor of the second jack, said network having, in series connection, a first resistor and a first LED, the first LED being shunted by a second LED, said first and second LEDs having opposite polarities;

a second resistor connected between the third and fourth conductors of the second jack;

a second network shunting said second resistor and having, in series connection, a third resistor, a zener diode and a third LED;

a third network shunting said second network and having, in series connection a fourth resistor and a fourth LED, said third and fourth LEDs having opposite polarities; and a manually operated two position switch connected between the first, second, third and fourth conductors of the first jack and the third and fourth conductors of the second jack, said switch having a first position at which the first and third conductors of the first jack are connected to the third and fourth conductors respectively of the second jack while the second and fourth conductors of the first jack are disconnected, said switch having a second position at which the second and fourth conductors of the first jack are connected to the third and fourth conductors respectively of the second jack while the first and third conductors of the first jack are disconnected.

2. Apparatus as set forth in claim 1 wherein said first and third LEDs have like polarities.

3. Apparatus as set forth in claim 2 wherein each LED emits light of a color different from all other LEDs.

4. Apparatus as set forth in claim 3 wherein said switch is a double pole double throw switch.

5. Apparatus as set forth in claim 4 wherein said first resistor and said fourth resistor have like values.

6. Apparatus as set forth in claim 5 wherein said first LED is green emitting, said second LED is amber emitting, said third LED is green emitting and said fourth LED is red emitting.

* * * * *